United States Patent
Zhang et al.

(10) Patent No.: US 11,912,364 B2
(45) Date of Patent: Feb. 27, 2024

(54) MOUNTING STRUCTURE OF SCOOTER SEAT AND SCOOTER

(71) Applicant: NINEBOT (BEIJING) TECH. CO., LTD, Beijing (CN)

(72) Inventors: Haoran Zhang, Beijing (CN); Zhilei Ding, Beijing (CN)

(73) Assignee: NINEBOT (BEIJING)TECH. CO., LTD, Beijing (CN)

( * ) Notice: Subject to any disclaimer, the term of this patent is extended or adjusted under 35 U.S.C. 154(b) by 734 days.

(21) Appl. No.: 17/053,541

(22) PCT Filed: Dec. 29, 2018

(86) PCT No.: PCT/CN2018/125851
§ 371 (c)(1),
(2) Date: Nov. 6, 2020

(87) PCT Pub. No.: WO2019/218689
PCT Pub. Date: Nov. 21, 2019

(65) Prior Publication Data
US 2021/0229768 A1    Jul. 29, 2021

(30) Foreign Application Priority Data
May 18, 2018  (CN) .......................... 201820747304.8

(51) Int. Cl.
*B62J 1/08*  (2006.01)
(52) U.S. Cl.
CPC ...................... *B62J 1/08* (2013.01)
(58) Field of Classification Search
CPC ....... B62J 1/08; B62J 1/14; B62J 1/00; B62K 19/36; B62K 19/30; B62K 19/00
See application file for complete search history.

(56) References Cited

U.S. PATENT DOCUMENTS

| 1,658,068 | A | * | 2/1928 | White | ......................... B62J 1/08 |
| | | | | | 280/14.28 |
| 2,439,556 | A | * | 4/1948 | Bancroft | ................ B62K 3/002 |
| | | | | | 280/87.041 |

(Continued)

FOREIGN PATENT DOCUMENTS

| CN | 104670385 A | 6/2015 |
| CN | 105292315 A | 2/2016 |

(Continued)

OTHER PUBLICATIONS

International Search Report in the international application No. PCT/CN2018/125851, dated Mar. 7, 2019, 2 pgs.

(Continued)

*Primary Examiner* — James M Dolak
(74) *Attorney, Agent, or Firm* — Cooper Legal Group, LLC

(57) ABSTRACT

A mounting assembly of a scooter seat, and a scooter. The mounting assembly comprises a mounting base (120), a supporting block (130), and a fastener; the mounting base (120) comprises a top plate (122) and two side plates (123) fixedly provided on two opposite sides of the top plate (122); mounting holes for fixing the scooter seat (900) are provided on the top plate (122); the two side plates (123) are clamped on the scooter body; the top plate (122) is provided on a footboard of the scooter body; the supporting block (130) is interposed between the scooter body and the side plates (123); the fastener is provided on the side plates (123) and tightly locks the supporting block (130) to enable the supporting block (130) to be fastened on the scooter body.

16 Claims, 11 Drawing Sheets

(56) References Cited

U.S. PATENT DOCUMENTS

| | | | | |
|---|---|---|---|---|
| 3,006,659 | A * | 10/1961 | Krasnoff | B62K 3/002 188/24.11 |
| 6,832,774 | B1 * | 12/2004 | Zaccagnini | B62K 3/002 280/274 |
| 7,077,229 | B2 * | 7/2006 | Lee | B62K 3/002 180/181 |
| 7,832,746 | B2 * | 11/2010 | Peterson | B62H 1/12 280/30 |
| 8,720,995 | B2 * | 5/2014 | Wu | B62J 1/00 297/334 |
| 8,746,730 | B2 * | 6/2014 | Wu | B62K 15/008 280/287 |
| 8,827,284 | B2 * | 9/2014 | Walther | B62K 5/023 280/87.041 |
| 9,010,780 | B1 * | 4/2015 | Chiu | B62K 13/00 280/87.05 |
| 9,016,702 | B2 * | 4/2015 | Huang | B62K 15/00 280/87.041 |
| 9,598,136 | B1 * | 3/2017 | Kim | B62K 21/00 |
| 9,809,272 | B2 * | 11/2017 | Mazoyer | B62K 3/002 |
| 9,919,762 | B2 * | 3/2018 | Kim | B62J 25/04 |
| 9,988,114 | B1 * | 6/2018 | Freakes | B62K 27/003 |
| 10,407,119 | B1 * | 9/2019 | Greenberg | B62K 15/006 |
| 11,066,119 | B2 * | 7/2021 | Zhang | B62K 5/007 |
| 11,136,089 | B2 * | 10/2021 | Paris | B62K 3/002 |
| 2009/0115149 | A1 * | 5/2009 | Wallis | B60N 2/544 280/6.159 |
| 2010/0126789 | A1 | 5/2010 | Scragg | |
| 2012/0242117 | A1 | 9/2012 | Wu | |
| 2012/0280467 | A1 | 11/2012 | Walther | |

FOREIGN PATENT DOCUMENTS

| | | |
|---|---|---|
| CN | 205131450 U | 4/2016 |
| CN | 205971612 U | 2/2017 |
| CN | 206141711 U | 5/2017 |
| NL | 1026047 C2 | 10/2005 |
| WO | 2008125786 A2 | 10/2008 |

OTHER PUBLICATIONS

English translation of the Written Opinion of the International Search Authority in the international application No. PCT/CN2018/125851, dated Mar. 7, 2019, 3 pgs.

Supplementary European Search Report in the European application No. 18918862.6, dated Jun. 9, 2021, 10 pgs.

* cited by examiner

A-A

MOUNTING STRUCTURE OF SCOOTER SEAT AND SCOOTER

CROSS-REFERENCE TO RELATED APPLICATION

This application claims benefit of Chinese Patent Application No. 201820747304.8, the contents of which are hereby incorporated by reference in their entirety.

TECHNICAL FIELD

This disclosure relates to a scooter having a seat, and more particularly, to a mounting assembly for a scooter seat and a scooter.

BACKGROUND

Due to traffic congestion, scooters currently become a more popular mobility tool. Existing scooters generally do not have seats. Users will be tired when standing on the scooter for a long time during riding, so it is necessary to mount seats on scooters. However, there is currently no seat mounting assembly for those scooters without seat, so it is necessary to provide a mounting assembly common for various types of scooters. Users can use this mounting assembly to quickly and easily mount seats onto the scooters.

SUMMARY

In order to solve the existing technical problems, the embodiments of the disclosure provide a mounting assembly for a scooter seat, and a scooter. According to the mounting assembly for a scooter seat, supporting blocks with a right triangle-shaped cross section are placed between two side plates of a mounting base and a scooter body, and a clamping force is applied to the supporting block by a fastener, so that the supporting block generates a clamping force on the scooter body, thereby fixing the mounting base to the scooter body. When using a scooter, a user can mount a seat through the mounting assembly for a scooter seat at first, thereby reducing the fatigue caused by standing on the scooter for a long time, and improving the user's comfort in using the scooter.

The technical solution of the embodiments of the disclosure is implemented as follows.

A mounting assembly for a scooter seat may include a mounting base, a supporting block and a fastener. The mounting base may include a top plate and two side plates fixedly arranged on two opposite sides of the top plate respectively. The top plate may be provided with mounting holes for fixing the scooter seat. The two side plates may be clamped on a scooter body. The top plate may be located on a footboard of the scooter body. The supporting block may be interposed between the scooter body and the side plate. The fastener may be arranged on the side plate and locks the supporting block, to fasten the supporting block onto the scooter body.

In an exemplary embodiment, the fastener may be a bolt. The side plate may be provided with a threaded hole matching the bolt. The bolt may pass through the threaded hole to abut against the supporting block and lock the supporting block, to fasten the supporting block onto the scooter body.

In an exemplary embodiment, the side plate may be provided with two threaded holes, one of the two threaded holes is located at one end of the side plate, and another one of the two threaded holes is located at another end of the side plate.

In an exemplary embodiment, a gap may be formed between a bottom of the scooter body and the side plate. The shape of the supporting block may conform to the shape of the gap, and the supporting block may be interposed in the gap.

In an exemplary embodiment, the bottom of the scooter body may be provided with a first inclined surface. The first inclined surface extends toward the bottom of the scooter body and is inclined toward a central portion of the scooter body. A gap may be formed between the first inclined surface and the side plate. A side of the supporting block adjacent to the scooter body may be provided with a second inclined surface. An inclination direction of the second inclined surface corresponds to an inclination direction of the first inclined surface. When the supporting block is interposed in the gap, the first inclined surface may abut against the second inclined surface.

A shape of a cross section of the gap may be a right triangle. A shape of a cross section of the supporting block may be a right triangle. The cross section of the supporting block may be perpendicular to the top plate and the side plate, respectively.

In an exemplary embodiment, the supporting block may be provided with limiting blocks respectively located at two ends of the supporting block. The limiting blocks may be configured to limit the relative displacement of the supporting block and the side plate. A direction of the relative displacement may be parallel to the top plate and the side plate of the mounting base.

In an exemplary embodiment, the supporting block may be further provided with a reinforcing rib.

In an exemplary embodiment, the mounting assembly may further include a connecting structure.

The connecting structure may be arranged between the fastener and the side plate. The fastener may be movable relative to the side plate through the connecting structure. When the fastener is moved to abut against the supporting block, the fastener may maintain a relative position of the supporting block and the scooter body constant, and fasten the supporting block to the scooter body. When the fastener moves to separate from the supporting block, the fastener no longer maintains the relative position of the supporting block and the scooter body, and the supporting block may be separable from the scooter body.

In an exemplary embodiment, a metal sleeve may be arranged between the fastener and the supporting block, and the fastener may abut against the supporting block through the metal sleeve.

A side of the supporting block adjacent to the side plate may be provided with a groove. The metal sleeve may be inserted into the groove. An end wall of the metal sleeve may abut against a bottom of the groove. A side wall of the metal sleeve may be adjacent to a side wall of the groove.

An end of the fastener may be inserted into the metal sleeve and may abut against the end wall of the metal sleeve.

A scooter may include the aforementioned mounting assembly for a scooter seat, a scooter body, a support rod, and a seat.

One end of the support rod may be mounted on the scooter body through the mounting assembly, and the other end of the support rod may be mounted on the seat.

In the embodiments of the disclosure, a scooter is provided with a seat. When a user uses the scooter, the seat may be mounted through a mounting assembly for a scooter seat, and the user can sit on the mounted seat, thereby reducing the fatigue caused by standing on the scooter for a long time, and improving the user's comfort in using the scooter.

In the mounting assembly for a scooter seat provided by the embodiments of the disclosure, supporting blocks with a right triangle-shaped cross section are placed between two side plates of a mounting base and a scooter body, and a clamping force is applied to the supporting block by a fastener, so that the supporting block generates a clamping force on the scooter body, thereby fixing the mounting base to the scooter body. The shape of the gap between the scooter body and the side plate conforms to the shape of the supporting block, and the structure of the mounting base and the direction of the clamping force of the supporting block to the scooter body are biased toward the top plate of the mounting base, so that the stability of fixing the mounting base and the scooter body is ensured, thereby ensuring the stability of the seat mounted on the mounting base, and avoiding the impact of the scooter during the use of the scooter to break the seat from the mounting base. In addition, the process of mounting the mounting base on the scooter body is simple and easy to operate, thereby improving the efficiency of seat mounting of the scooter.

DETAILED DESCRIPTION

Figure 1A:
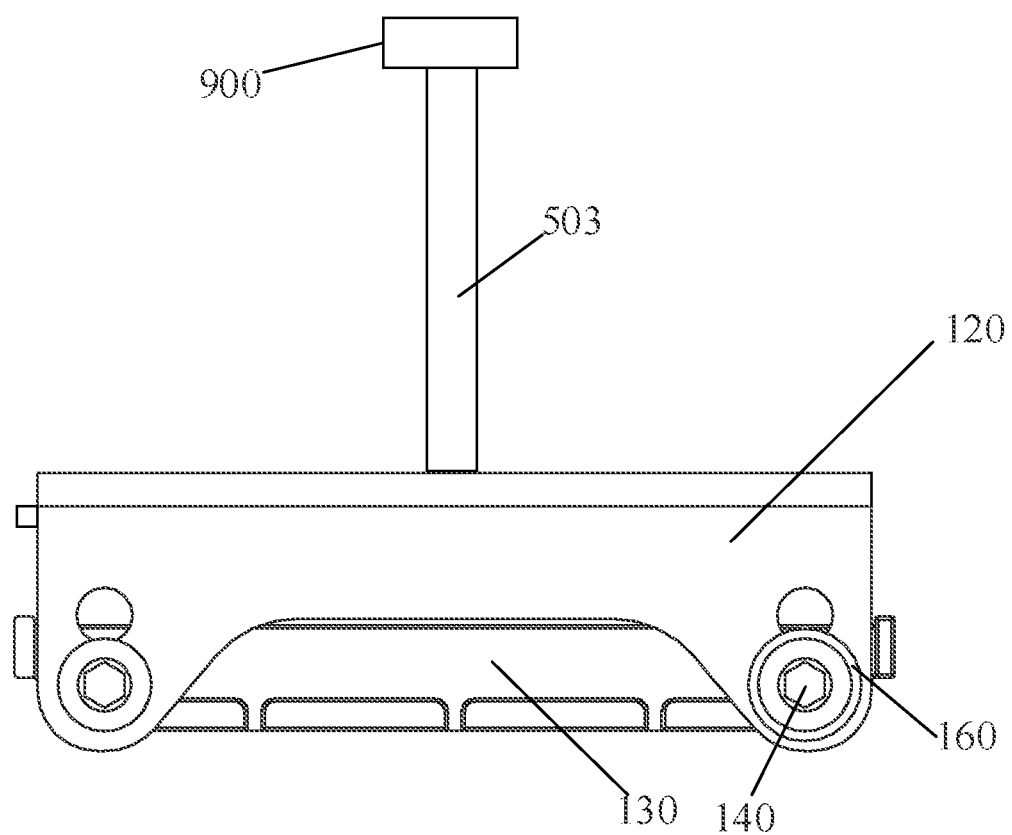
FIG. 1a is a front view of a mounting assembly for a scooter seat according to the disclosure.

Exemplary embodiments of the disclosure will be described in more detail below with reference to the accompanying drawings. Although the exemplary embodiments of the disclosure are shown in the drawings, it should be understood that the disclosure may be implemented in various forms without being limited by the embodiments elaborated herein. Rather, these embodiments are provided so that the disclosure will be more fully understood, and the scope of the disclosure can be fully conveyed to those skilled in the art.

Figure 1B:
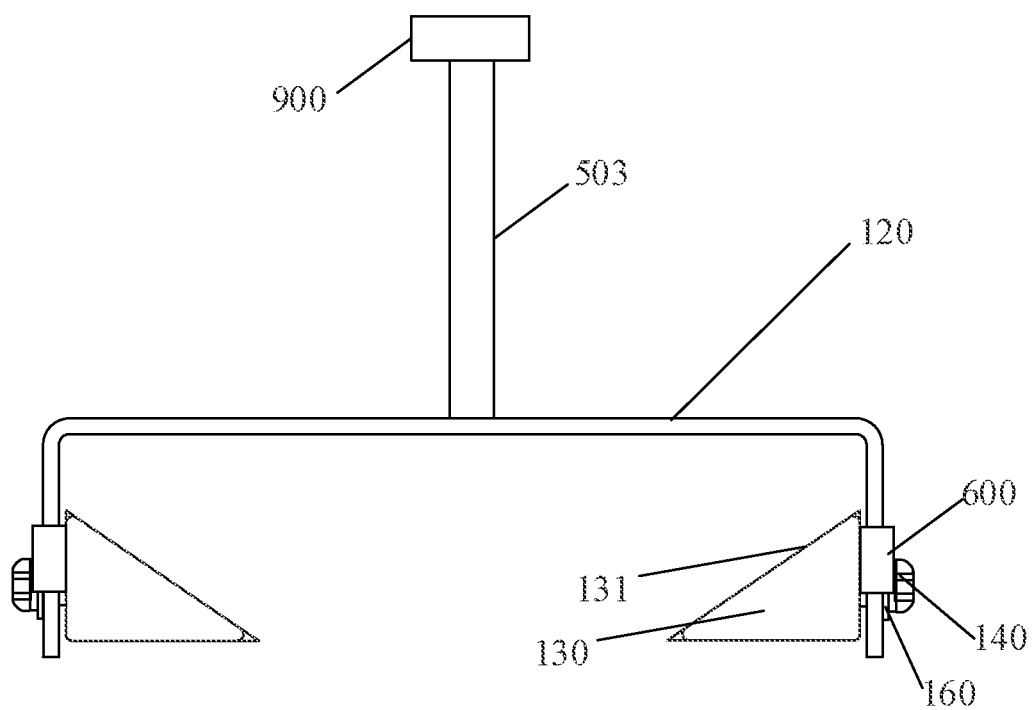
FIG. 1b is a left view of a mounting assembly for a scooter seat according to the disclosure.
Figure 2:
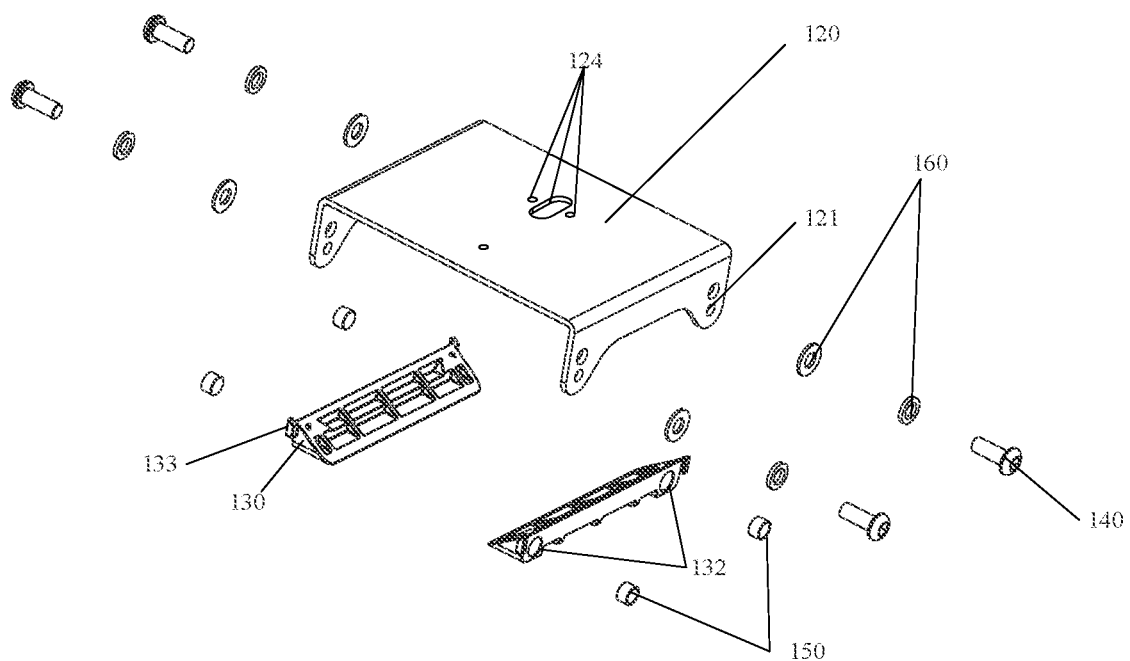
FIG. 2 is an exploded perspective view of a mounting assembly for a scooter seat according to the disclosure.

FIG. 1a and FIG. 1b are a front view and a left view of a mounting assembly for a scooter seat according to the disclosure. FIG. 2 is an exploded perspective view of a mounting assembly for a scooter seat according to the disclosure. A scooter seat is not shown in FIG. 2.

Referring to FIG. 1a, FIG. 1b and FIG. 2, the mounting assembly for a scooter seat of the disclosure includes a mounting base 120 for mounting a scooter seat 900, a supporting block 130, a fastener, a metal sleeve 150, and a washer 160.

Figure 3:
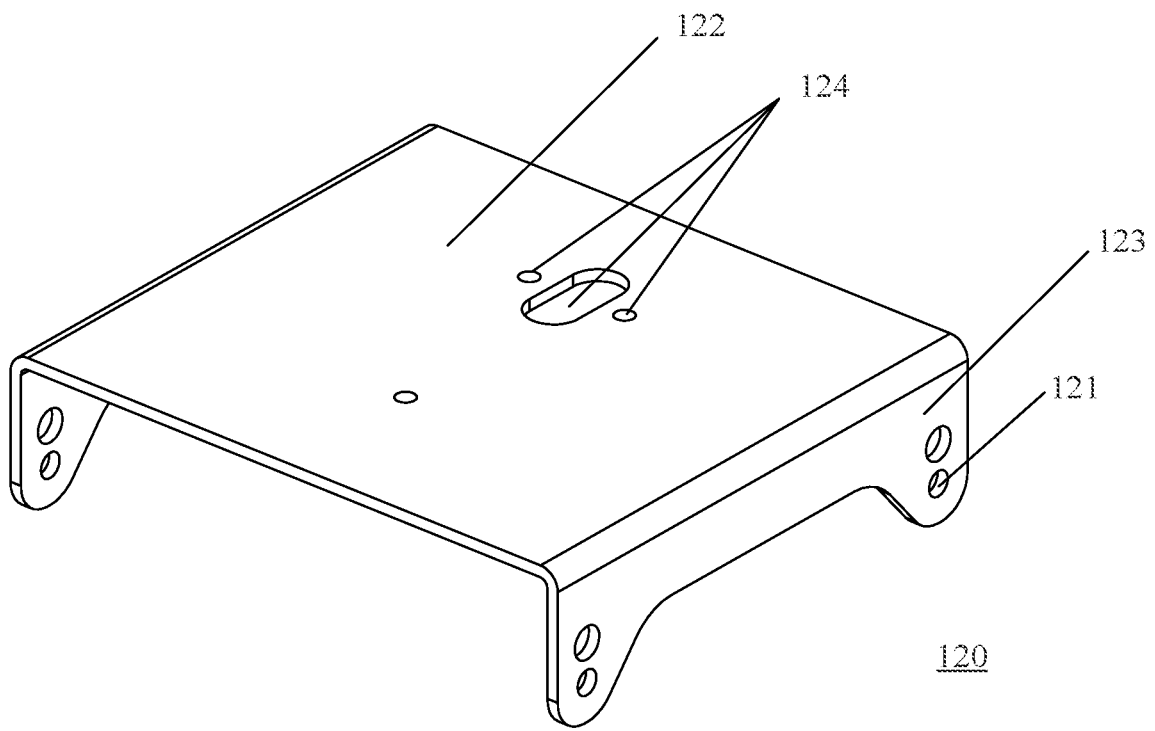
FIG. 3a is a perspective view of a mounting base of a mounting assembly for a scooter seat according to the disclosure.
FIG. 3b is a front view of a mounting base of a mounting assembly for a scooter seat according to the disclosure.
FIG. 3c is a left view of a mounting base of a mounting assembly for a scooter seat according to the disclosure.
Figure 3B:
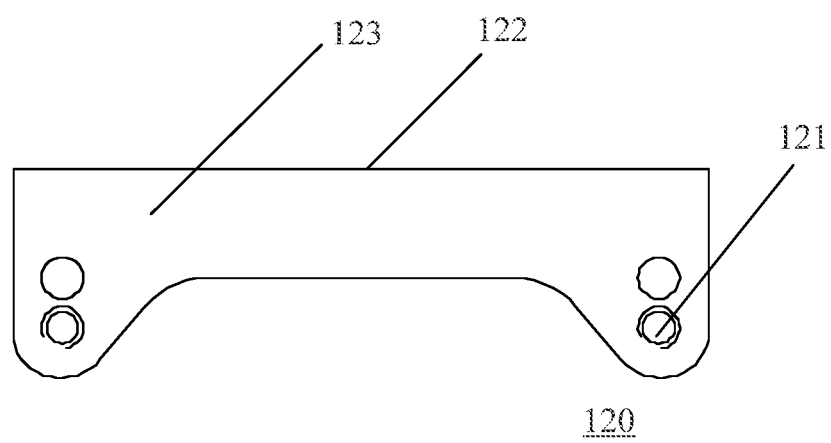
Figure 3C:
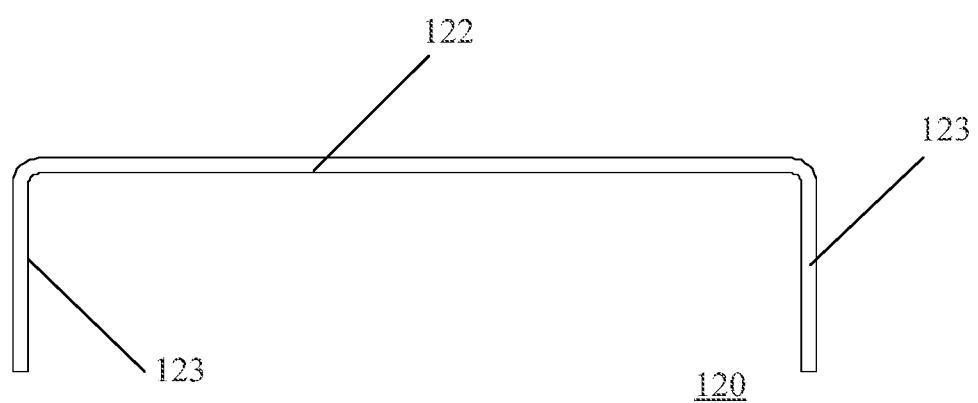

FIG. 3a, FIG. 3b and FIG. 3c are a perspective view, a front view and a left view of the mounting base 120 of a mounting assembly for a scooter seat according to the disclosure, respectively.

The mounting base 120 includes a top plate 122 and two side plates 123 fixedly arranged on two opposite sides of the top plate 122. The top plate 122 is connected between upper edges of the two side plates 123, so that the top plate 122 and the two side plates 123 form a receiving space. As an example, the two side plates 123 are perpendicular to the top plate 122, respectively. The top plate 122 is provided with a mounting hole 124 for fixing the scooter seat 900. A footboard 502 is mounted on a scooter body 501, that is, a footboard 502 is mounted on the top side of the scooter body 501. The footboard 502 is a plate on which a user stands when using the scooter. The scooter body 501 is generally in the form of a long strip. At least part of the scooter body 501 is located in the receiving space formed by the top plate 122 and the two side plates 123, so that a standing surface of the footboard 502 corresponds to and contacts a lower surface of the top plate 122 of the mounting base 120, and both sides of the scooter body 501 correspond to the side plates 123 of the mounting base 120.

In the embodiments of the disclosure, the top plate 122 is located on the footboard 502 of the scooter body 501, that is, the top plate 122 is located on the top side of the footboard 502 of the scooter body 501, so that the user can sit on the top side of the footboard 502 of the scooter body 501 through the mounting base. For example, the top plate 122 may abut against the footboard 502 of the scooter body 501, and the two side plates 123 are clamped on the scooter body 501. That is, the two side plates 123 are clamped on the outside of the scooter body 501 and correspond to both sides of the scooter body 501, so that at least part of the scooter body 501 is located in the receiving space formed by the top plate 122 and the two side plates 123. The scooter body 501 bears the mounting base 120 through the abutment of the top plate 122 against the footboard 502 of the scooter body 501.

Of course, there may also be a gap between the top plate 122 and the footboard 502. At this time, the scooter body 501 bears the mounting base 120 mainly by the abutment of the supporting block 130 against the scooter body 501.

In some exemplary embodiments, each side plate 123 of the mounting base 120 includes at least two threaded holes 121, and the at least two threaded holes 121 are evenly distributed on the side plate 123 of the mounting base 120. When the side plate 123 is provided with two threaded holes 121, one of the two threaded holes is located at one end of the side plate, and another one of the two threaded holes is located at another end of the side plate 123.

Figure 4A:
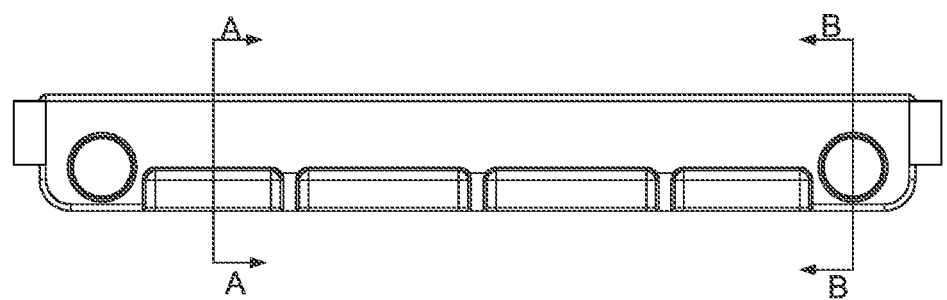
FIG. 4a is a front view of a supporting block of a mounting assembly for a scooter seat according to the disclosure.
Figure 4B:
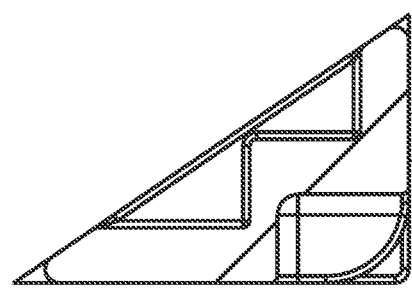
FIG. 4b is a cross-sectional view of a supporting block of a mounting assembly for a scooter seat according to the disclosure.
Figure 4C:
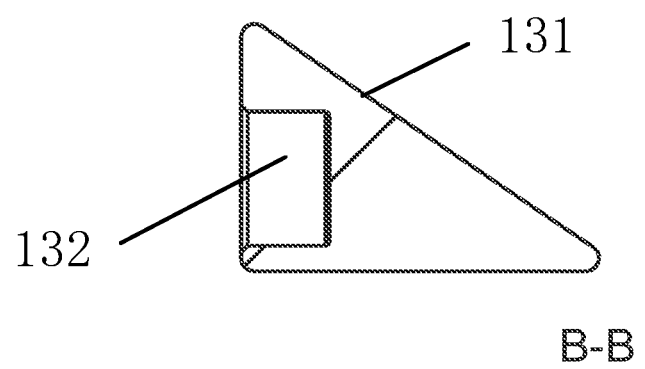
FIG. 4c is a cross-sectional view of a supporting block of a mounting assembly for a scooter seat according to the disclosure.

FIG. 4a is a front view of the supporting block 130 of a mounting assembly for a scooter seat according to the disclosure. FIG. 4b and FIG. 4c are cross-sectional views of the supporting block 130 of a mounting assembly for a scooter seat according to the disclosure, respectively. FIG.

4b is a cross-sectional view in an A-A direction in FIG. 4a. FIG. 4c is a cross-sectional view in a B-B direction in FIG. 4a.

Figure 6:
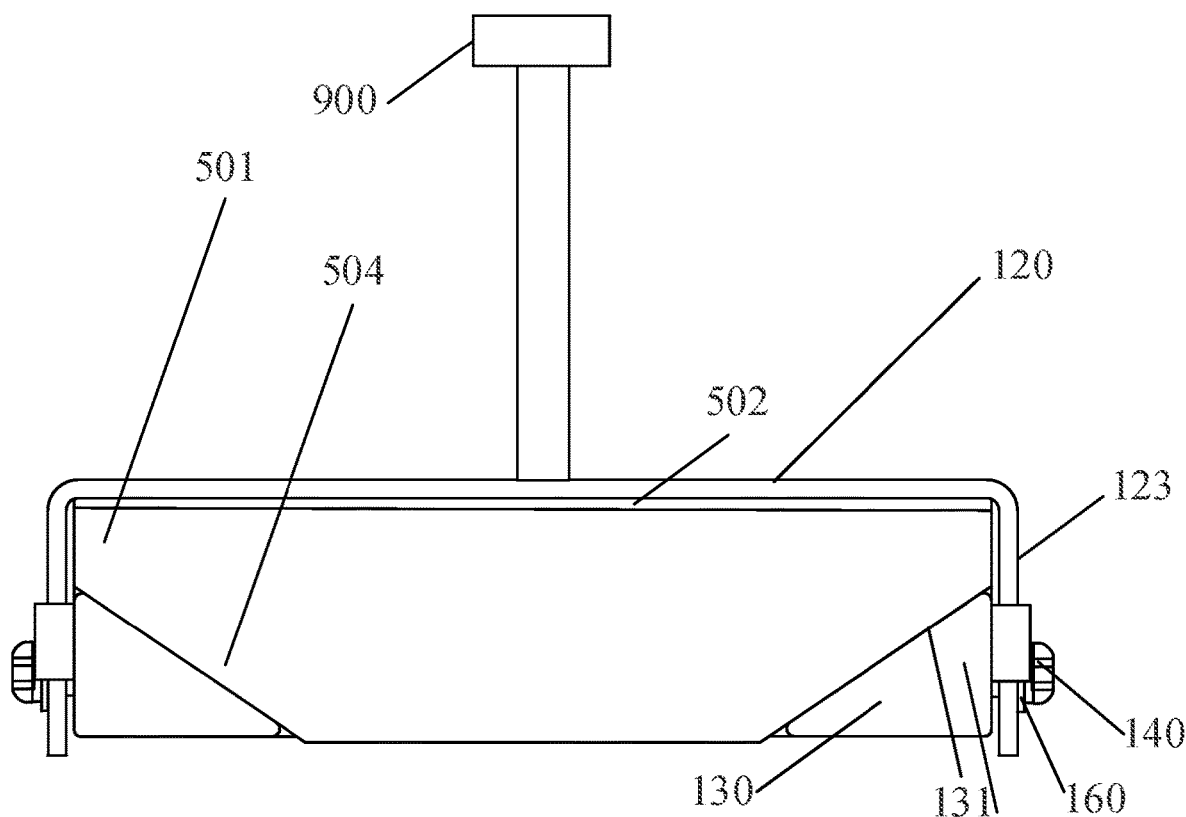
FIG. 6 is a left view showing a mounting assembly mounted on a scooter body of the scooter according to the disclosure.

As shown in FIG. 6, the supporting block 130 is located at a gap between a bottom 504 of the scooter body 501 and the side plate 123. There may be two supporting blocks 130 located in the gaps between the two side plates 123 and the two sides of the bottom 504 of the scooter body 501.

In some exemplary embodiments, the shape of the supporting block 130 conforms to the shape of the gap between the scooter body 501 and the side plate 123. The shape of cross section of the supporting block 130 may be a right triangle. A tangent plane of the cross section is perpendicular to the top plate 122 and the side plate 123 of the mounting base 120. A right-angle side of the right triangle corresponds to the side plate 123 of the mounting base 120. A hypotenuse of the right triangle corresponds to the side of the scooter body 501.

As an example, as shown in FIG. 1b, the bottom 504 of the scooter body 501 is provided with a first inclined surface. The first inclined surface extends toward the bottom 504 of the scooter body 501 and is inclined toward a central portion of the scooter body 501. A gap is formed between the first inclined surface and the side plate 123. A side of the supporting block 130 adjacent to the scooter body 501 is provided with a second inclined surface 131. An inclination direction of the second inclined surface 131 corresponds to an inclination direction of the first inclined surface. When the supporting block 130 is interposed in the gap, the first inclined surface abuts against the second inclined surface 131.

In some exemplary embodiments, the supporting block 130 includes a limiting block 133 and a reinforcing rib. The limiting blocks 133 are arranged at both ends of the supporting block 130, and are configured to limit the relative displacement between the supporting block 130 and the side plate 123 of the mounting base 120. A direction of the relative displacement is parallel to the top plate 122 and the side plate 123 of the mounting base 120. As an example, the limiting block 133 is snapped on the edge of the side plate 123 of the mounting base 120. The supporting block 130 may be a hollow structure, a reinforcing rib is arranged in a hollow portion of the supporting block 130. As such, the support strength of the supporting block 130 can be enhanced, and the supporting block 130 is prevented from a deformation caused by compression, thereby improving the performance of the mounting assembly for a scooter seat.

In the embodiments of the disclosure, the fastener is arranged on the side plate 123 and locks the supporting block 130, so that the manner for fastening the supporting block 130 on the scooter body 501 is not limited. For example, the fastener makes the supporting block 130 abut against the scooter body 501, and the fastener maintains the relative position of the supporting block 130 and the scooter body 501 constant, so that the supporting block 130 is fastened on the scooter body 501, and the supporting block 130 cannot be separated from the scooter body 501.

Here, the manner enabling the supporting block 130 to abut against the scooter body 501 by the fastener is not limited. For example, the mounting assembly may further include: a connecting structure 600 arranged between the fastener and the side plate 123. The fastener is movable relative to the side plate 123 through the connecting structure 600. When the fastener is moved to abut against the supporting block 130, the fastener maintains a relative position of the supporting block 130 and the scooter body 501 constant, so that the supporting block 130 is fastened to the scooter body 501. At this time, the supporting block 130 cannot be removed. When the fastener moves to separate from the supporting block 130, the fastener no longer maintains the relative position of the supporting block 130 and the scooter body 501, and the supporting block 130 is separable from the scooter body 501. At this time, the supporting block 130 can be removed.

In another example, one end of the fastener is connected to the side plate 123, and the other end is located between the supporting block 130 and the side plate 123 and is in contact with the supporting block 130. Through the fastening of the fastener, the fastener clamps the supporting block 130, and the supporting block 130 clamps the scooter body 501, so that the mounting base 120 is fastened on the scooter body 501.

In some exemplary embodiments, the fastener may be a bolt 140, the bolt 140 matches the threaded hole 121 on the side plate 123 of the mounting base 120. The bolt 140 passes through the threaded hole 121 to abut against the supporting block 130 and tightly locks the supporting block 130, so that the supporting block 130 is fastened on the scooter body 501. That is, the bolt 140 is screwed in the side plate 123 through the threaded hole 121 to form a connection between the bolt 140 and the side plate 123. Specifically, a threaded portion of the bolt 140 passes through the threaded hole 121 from an outer surface of the side plate 123, so that the head of the bolt 140 is located on the outer surface of the side plate 123. One end of the bolt 140 passing through the side plate 123 is located between the supporting block 130 and the side plate 123, and is in contact with the supporting block 130. When the bolt 140 is tightened, the bolt 140 generates a clamping force on the supporting block 130, the supporting block 130 in turn generates a clamping force on the scooter body 501, so that the mounting base 120 is fastened on the scooter body 501. The number of the bolts 140 is the same as the number of the threaded holes 121.

In some exemplary embodiments, the mounting assembly for a scooter seat further includes: a metal sleeve 150. The metal sleeve 150 is located between the fastener and the supporting block 130. The fastener abuts against the supporting block 130 through the metal sleeve 150. The stress of the fastener on the supporting block 130 can be decentralized, and the damage to the supporting block 130 by stress concentration can be reduced.

As an example, as shown in FIG. 2, a side of the supporting block 130 adjacent to the side plate 123 is provided with a groove 132. The metal sleeve 150 is inserted into the groove 132. An end wall of the metal sleeve 150 abuts against a bottom of the groove 132, and a side wall of the metal sleeve 150 is adjacent to a side wall of the groove 132. An end of the fastener is inserted into the metal sleeve 150 and abuts against the end wall of the metal sleeve 150. In this case, in the process of the fastener moving away from the scooter body 501, when the fastener moves such that the fastener is separated from the end wall of the metal sleeve 150, the end of the fastener is also located in the groove 132. Although there is a gap between the supporting block 130 and the scooter body 501, the supporting block 130 will not fall. Only when the fastener moves and completely exits the groove 132, the supporting block 130 can be removed. By the abutment of the fastener against the end wall of the metal sleeve 150, the supporting block 130 can be effectively prevented from being lost when the fastener is loosened. The material of the supporting block 130 may be a high polymer material. In this way, the scooter body 501 can be prevented from a damage caused by the supporting block 130 abutting against the scooter body 501.

Of course, the fastener may also directly abut against the bottom of the groove 132, and the supporting block 130 can also be prevented from being lost when the fastener is loosened.

The number of the grooves 132 is not limited. For example, as shown in FIG. 2, the number of the grooves 132 is two, and the two grooves 132 are located at two ends of the supporting block 130.

In some exemplary embodiments, the mounting assembly for a scooter seat further includes a washer 160. The washer 160 is located between the side plate 123 and the head of the bolt 140. The pressure of the head of the bolt 140 on the outer surface of the side plate 123 of the mounting base 120 can be decentralized. The outer surface of the side plate 123 of the mounting base 120 is prevented from the wear.

In addition, by arranging the threaded holes 121 at different positions of the side plate 123 of the mounting base 120, the mounting assembly for a scooter seat of the disclosure can be adapted to scooter bodies of different types of scooters.

In the mounting assembly for a scooter seat provided by the disclosure, the supporting block 130 with a right triangle-shaped cross section is placed between two side plates 123 and the scooter body 501. A clamping force is applied to the supporting block 130 by the fastener, so that the supporting block 130 generates a clamping force on the scooter body 501, thereby fixing the mounting base 120 to the scooter body 501. Because the shape of the gap between the scooter body 501 and the side plate 123 matches the shape of the supporting block 130, and because the direction of the clamping force of exerted by the structure of the mounting base 120 and the supporting block 130 to the scooter body 501 are perpendicular to the hypotenuse of the right triangle, that is, the direction of the clamping force is biased toward the top plate 122 of the mounting base 120, the stability of fixing the mounting base 120 and the scooter body 501 can be improved, which not only makes the scooter seat 900 fixed stably on the scooter body 501, but also prevents the mounting base 120 from being broken by the impact during the use of the scooter. In addition, the mounting process of the mounting base 120 is simple and easy to operate, thereby improving the working efficiency of mounting the mounting base 120.

A mounting method for the mounting assembly for a scooter seat of the disclosure may be as follows.

Firstly, the mounting base 120 is engaged on the scooter body 501, and the supporting block 130 and the metal sleeve are placed in a gap formed by the scooter body 501 and the side plate 123 of the mounting base 120, so that the hypotenuse of the right triangle of the cross section of the supporting block 130 is opposite to the scooter body 501, a straight side of the right triangle is opposite to the side plate 123, and the two sides of the scooter body 501 are located between the limiting blocks 133 of the supporting block 130.

Subsequently, at least two bolts 140 are respectively mounted in the threaded holes 121 of the side plate 123, so that one end of each bolt 140 passing through the threaded hole is flush with the inner surface of the corresponding side plate 123.

Subsequently, the bolts 140 on the two side plates 123 are tightened at the same time, so that the bolts 140 generate a clamping force on the supporting block 130 through the metal sleeve 150, and the supporting block 130 in turn generates a clamping force on the scooter body 501 until the clamping force can tightly fix the mounting base 120 on the scooter body 501.

Figure 5:
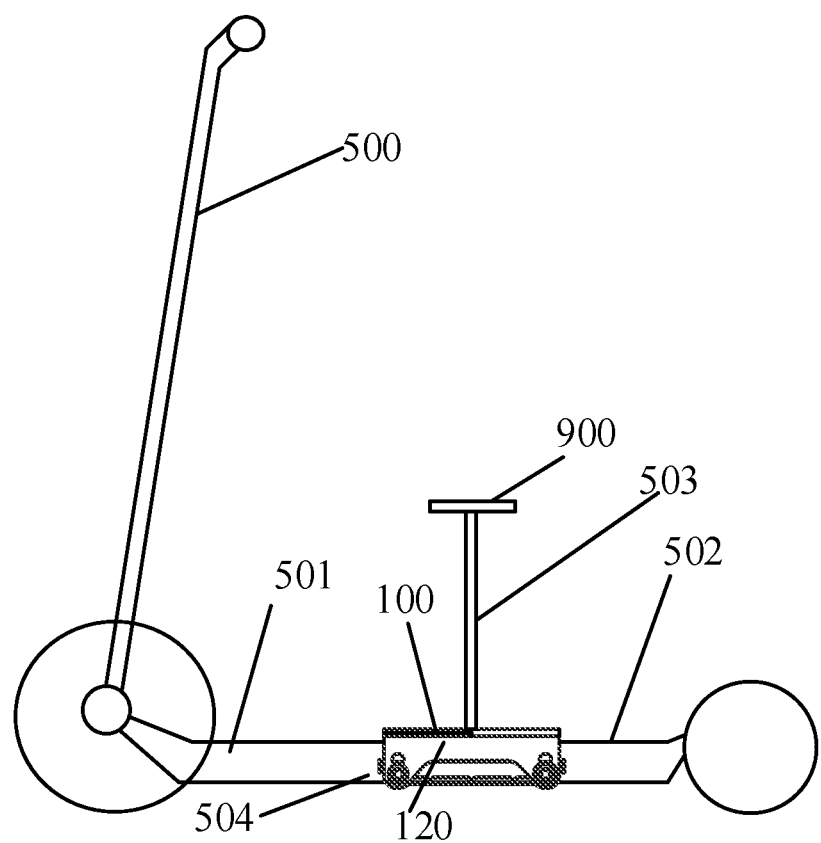
FIG. 5 is a schematic view of a scooter according to the disclosure, on which a scooter seat is mounted by the mounting assembly.

FIG. 5 is a schematic view of a scooter according to the disclosure, on which a scooter seat is mounted by the mounting assembly. The scooter 500 according to the embodiment of the disclosure includes the aforementioned mounting assembly 100 for a scooter seat 900, a scooter body 501, a support rod 503, and a seat 900. One end of the support rod 503 is mounted on the scooter body 501 through the mounting assembly 100, and the other end of the support rod 503 is mounted on the seat 900. The seat is mounted on the scooter body 501 through the mounting assembly 100 for a scooter seat, and a user can sit on the mounted seat, thereby reducing the fatigue caused by the user standing on the scooter 500 for a long time, and improving the user's comfort in using the scooter 500.

In the specification provided here, a number of specific details are explained. However, it is to be understood that the embodiments of the disclosure may be practiced without these specific details. In some embodiments, the methods, structures and techniques are not shown in detail so as not to obscure the understanding of this specification.

In addition, the above descriptions are only the original solution and preferred embodiments of the disclosure. It is to be noted that for those skilled in the art, on the basis of the principles of the disclosure, several other variations can be made, and these variations are also considered to fall within the scope of the disclosure.

In addition, those skilled in the art can understand that the combination of features of different embodiments means to be within the scope of the disclosure and form different embodiments. For example, in the claims, any one of the claimed embodiments can be used in any combination.

It is to be noted that the above embodiments illustrate the disclosure rather than limit the disclosure, and those skilled in the art can design alternative embodiments without departing from the scope of the appended claims. In the claims, any reference signs placed between parentheses shall not be construed as limiting the claims. The word "include" does not exclude the presence of elements not listed in the claims. The word "a" or "an" preceding an element does not exclude the presence of a plurality of such elements.

The invention claimed is:

1. A mounting assembly for a scooter seat, comprising a mounting base, two supporting blocks and two fasteners, wherein the mounting base comprises a top plate and two side plates fixedly arranged on two opposite sides of the top plate respectively; the top plate is provided with mounting holes for fixing a support rod which is configured to mount the scooter seat; the two side plates are arranged on two opposite sides of a scooter body respectively, at least part of the scooter body is located in a receiving space defined by the top plate and the two side plates; the top plate is located on a footboard of the scooter body; one of the two supporting blocks is interposed between the scooter body and one of the two side plates, another of the two supporting blocks is interposed between the scooter body and another of the two side plates; and each of the two fasteners is arranged on a respective one of the two side plates and locks a respective one of the two supporting blocks, to fasten the respective one of the two supporting blocks onto the scooter body.

2. The mounting assembly for the scooter seat according to claim 1, wherein each of the two fasteners is a bolt; and
each of the two side plates is provided with a threaded hole matching the bolt; the bolt passes through the threaded hole to abut against the respective one of the two supporting blocks and lock the respective one of the two supporting blocks, to fasten the respective one of the two supporting blocks onto the scooter body.

3. The mounting assembly for the scooter seat according to claim 2, wherein each of the two side plates is provided with two threaded holes, one of the two threaded holes being located at one end of a corresponding side plate of the two side plates, and another one of the two threaded holes being located at another end of the corresponding side plate.

4. The mounting assembly for the scooter seat according to claim 1, wherein a gap is formed between a bottom of the scooter body and each of the two side plates; and
a shape of each of the two supporting blocks conforms to a shape of the gap, and each of the two supporting blocks is interposed in the gap.

5. The mounting assembly for the scooter seat according to claim 4, wherein the bottom of the scooter body is provided with two first inclined surfaces extending toward the bottom of the scooter body and inclined toward a central portion of the scooter body; a second gap is formed between each of the two first inclined surfaces and the respective one of the two side plates; a side of each of the two supporting blocks adjacent to the scooter body is provided with a second inclined surface, an inclination direction of each of the second inclined surfaces corresponding to an inclination direction of a respective one of the two first inclined surfaces; when each of the two supporting blocks is interposed in the second gap, each of the two first inclined surfaces abuts against a respective one of the second inclined surfaces; and
a shape of a cross section of the second gap is a right triangle, a shape of a cross section of each of the two supporting blocks is a right triangle, and the cross section of each of the two supporting blocks is perpendicular to the top plate and the two side plates, respectively.

6. The mounting assembly for the scooter seat according to claim 1, wherein each of the two supporting blocks is provided with limiting blocks located at two ends of the respective one of the two supporting blocks; the limiting blocks are configured to limit a relative displacement of each of the two supporting blocks and the respective one of the two side plates, a direction of the relative displacement being parallel to the top plate and the two side plates of the mounting base.

7. The mounting assembly for the scooter seat according to claim 1, further comprising:
a connecting structure arranged between each of the two fasteners and the respective one of the two side plates, wherein each of the two fasteners is movable relative to the respective one of the two side plates through the connecting structure; when the two fasteners are moved to abut against the two supporting blocks, the two fasteners maintain a constant relative position of the two supporting blocks and the scooter body and fasten the two supporting blocks to the scooter body; and when the two fasteners move to separate from the two supporting blocks, the two fasteners no longer maintain the constant relative position of the two supporting blocks and the scooter body, and the two supporting blocks are separable from the scooter body.

8. The mounting assembly for the scooter seat according to claim 7, wherein a metal sleeve is arranged between each of the two fasteners and the respective one of the two supporting blocks, and each of the two fasteners abuts against the respective one of the two supporting blocks through the metal sleeve;
a side of each of the two supporting blocks adjacent to the respective one of the two side plates is provided with a groove; the metal sleeve is inserted into the groove; an end wall of the metal sleeve abuts against a bottom of the groove; and a side wall of the metal sleeve is adjacent to a side wall of the groove; and
an end of each of the two fasteners is inserted into the metal sleeve and abuts against the end wall of the metal sleeve.

9. A scooter, comprising:
a scooter body,
a support rod,
a scooter seat, and
a mounting assembly for the scooter seat, comprising a mounting base, two supporting blocks and two fasteners, wherein the mounting base comprises a top plate and two side plates fixedly arranged on two opposite sides of the top plate respectively; the top plate is provided with mounting holes for fixing the support rod which is configured to mount the scooter seat; the two side plates are arranged on two opposite sides of the scooter body respectively, at least part of the scooter body is located in a receiving space defined by the top plate and the two side plates; the top plate is located on a footboard of the scooter body; one of the two supporting blocks is interposed between the scooter body and one of the two side plates, another of the two supporting blocks is interposed between the scooter body and another of the two side plates; and each of the two fasteners is arranged on a respective one of the two side plates and locks a respective one of the two supporting blocks, to fasten the respective one of the two supporting blocks onto the scooter body,
wherein one end of the support rod is mounted on the scooter body through the mounting assembly, and a second end of the support rod is mounted on the scooter seat.

10. The scooter according to claim 9, wherein each of the two fasteners is a bolt; and
each of the two side plates is provided with a threaded hole matching the bolt; the bolt passes through the threaded hole to abut against the respective one of the two supporting blocks and lock the respective one of the two supporting blocks, to fasten the respective one of the two supporting blocks onto the scooter body.

11. The scooter according to claim 10, wherein each of the two side plates is provided with two threaded holes, one of the two threaded holes being located at one end of a corresponding side plate of the two side plates, and another one of the two threaded holes being located at another end of the corresponding side plate.

12. The scooter according to claim 9, wherein a gap is formed between a bottom of the scooter body and each of the two side plates; and
a shape of each of the two supporting blocks conforms to a shape of the gap, and each of the two supporting blocks is interposed in the gap.

13. The scooter according to claim 12, wherein the bottom of the scooter body is provided with two first inclined surfaces extending toward the bottom of the scooter body and inclined toward a central portion of the scooter body; a second gap is formed between each of the two first inclined surfaces and the respective one of the two side plates; a side of each of the two supporting blocks adjacent to the scooter body is provided with a second inclined surface, an inclination direction of each of the second inclined surfaces corresponding to an inclination direction of a respective one of the two first inclined surfaces; when each of the two supporting blocks is interposed in the second gap, each of the two first inclined surfaces abuts against a respective one of the second inclined surfaces; and a shape of a cross section of the second gap is a right triangle, a shape of a cross section of each of the two supporting blocks is a right triangle, and the cross section of each of the two supporting blocks is perpendicular to the top plate and the two side plates, respectively.

14. The scooter according to claim 9, wherein each of the two supporting blocks is provided with limiting blocks located at two ends of the respective one of the two supporting blocks; the limiting blocks are configured to limit a relative displacement of each of the two supporting blocks and the respective one of the two side plates, a direction of the relative displacement being parallel to the top plate and the two side plates of the mounting base.

15. The scooter according to claim 9, further comprising:

a connecting structure arranged between each of the two fasteners and the respective one of the two side plates, wherein each of the two fasteners is movable relative to the respective one of the two side plates through the connecting structure; when the two fasteners are moved to abut against the two supporting blocks, the two fasteners maintain a constant relative position of the two supporting blocks and the scooter body and fasten the two supporting blocks to the scooter body; and when the two fasteners move to separate from the two supporting blocks, the two fasteners no longer maintain the constant relative position of the two supporting blocks and the scooter body, and the two supporting blocks are separable from the scooter body.

16. The scooter according to claim 15, wherein a metal sleeve is arranged between each of the two fasteners and the respective one of the two supporting blocks, and each of the two fasteners abuts against the respective one of the two supporting blocks through the metal sleeve;

a side of each of the two supporting blocks adjacent to the respective one of the two side plates is provided with a groove; the metal sleeve is inserted into the groove; an end wall of the metal sleeve abuts against a bottom of the groove; and a side wall of the metal sleeve is adjacent to a side wall of the groove; and an end of each of the two fasteners is inserted into the metal sleeve and abuts against the end wall of the metal sleeve.

\* \* \* \* \*